United States Patent [19]

Okada

[11] Patent Number: 5,293,617
[45] Date of Patent: Mar. 8, 1994

[54] DATA BASE SYSTEM CAPABLE OF QUICKLY RESTORING A DATA BLOCK IN A DATA SECTION WHEN A FAULT OCCURS DURING OPERATION

[75] Inventor: Hidemi Okada, Tokyo, Japan
[73] Assignee: NEC Corporation, Tokyo, Japan
[21] Appl. No.: 813,839
[22] Filed: Dec. 27, 1991
[30] Foreign Application Priority Data Dec. 29, 1990 [JP] Japan .................................. 2-416164

[51] Int. Cl.$^5$ ............................................. G06F 15/40
[52] U.S. Cl. .............................. 395/600; 364/DIG. 1; 364/282.1; 364/238.6; 364/239; 364/243; 364/243.4
[58] Field of Search ......................... 395/600, 425, 400

[56] References Cited
U.S. PATENT DOCUMENTS

| | | | |
|---|---|---|---|
| 3,938,097 | 2/1976 | Niguette, III | 364/200 |
| 4,507,751 | 3/1985 | Gawlick et al. | 364/900 |
| 4,509,119 | 4/1985 | Gumaer et al. | 364/200 |
| 4,714,992 | 12/1987 | Gladney et al. | 364/200 |
| 5,170,480 | 12/1992 | Mohan et al. | 395/600 |
| 5,185,887 | 2/1993 | Takahashi et al. | 395/600 |

Primary Examiner—Kevin A. Kriess
Attorney, Agent, or Firm—Foley & Lardner

[57] ABSTRACT

In a data base system including a data base section for memorizing a plurality of data blocks and a buffer memory for memorizing a selected one of the data blocks as a buffered data block. The data base section includes a first memory unit for a first selected one of the data blocks as a first data block. Supplied with a search request signal which specifies a specific data block, a control unit transfers the first data block to the buffer memory when the specific data block is not present in the buffer memory but is present in the first memory unit. When the specific data block is also not present in the first memory unit, a reading unit reads the specific data block from the data base section and transfers the specific data block to the first memory unit under control of the control section. A copying unit transfers the specific data block to the buffer memory also under control of the control unit. Furthermore, the specific data block may be renewed into a renewal data block which is memorized in the buffer memory. The copying unit transfers the renewal data block to a second memory unit under control of the control unit. The control unit exchanges the specific data block for the renewal data block. Thereafter, the renewal and the specific data blocks are stored in the first and the second memory units, respectively.

10 Claims, 5 Drawing Sheets

DATA BASE SYSTEM CAPABLE OF QUICKLY RESTORING A DATA BLOCK IN A DATA SECTION WHEN A FAULT OCCURS DURING OPERATION

BACKGROUND OF THE INVENTION

This invention relates to a data base system having a buffer memory section which memorizes selected ones of data blocks transferred from a data base section.

A data base system of the type described comprises data base section for memorizing a plurality of data blocks to be searched, a processing section, and a buffer memory section between the data base section and the processing section. The buffer memory section is for temporarily memorizing selected ones of the data blocks as buffered data blocks. In addition, the processing section comprises a processing unit operable in accordance with a plurality of processing programs. At any rate, each of the processing programs runs on the processing unit.

Let a specific one of the data blocks be searched by a specific one of the processing programs through the processing unit to be received by the specific processing program. In this event, the specific processing program produces a request data block search signal which specifies the specific data block so that the processing unit accesses the data base section to deliver the specific data block to the buffer memory section. After delivery of the specific data block to the buffer memory section, the specific data block is often renewed into a renewal data block by the processing unit. The processing unit makes a data base history file store the specific data block as a history data. Furthermore, the processing unit sends the renewal data block to the buffer memory section and thereafter to the data base section on renewal of the specific data block into the renewal data block.

Under the circumstances, it is assumed that a fault occurs in the data base system during a search operation of the specific data block. In this case, the specific data block should be restored because an error might be included in the specific data block. Specifically, the processing unit accesses the data base history file to read the history data from the data base history file and sends the history data to the data base section in order to restore the specific data block in the data base section.

However, it is difficult to quickly restore the specific data block in the data base section in the conventional data base system because the history data must be read from the data base history file before transfer of the specific data block to the data base section. In addition, a processing ability of the processing unit is lowered because the processing unit inevitably refers to the data history file during each restoring operation.

SUMMARY OF THE INVENTION

It is an object of this invention to provide a data base system which is capable of quickly restoring a data base section.

Other objects of this invention will become clear as the description proceeds.

According to this invention, there is provided a data base system comprising a data base section for memorizing a plurality of data blocks, a buffer memory section for memorizing a selected one of the data blocks as a buffered data block, and a request producing section for producing a data block search request signal which specifies a specific data block when accesses the buffer memory section. The data base system further comprises first memory means for memorizing a first selected one of the data blocks as a first data block, and control means coupled to the request producing section, buffer memory section, and the first memory means for transferring the first data block to the buffer memory section in response to the data block search request signal when the specific data block is absent in the buffer memory section.

DESCRIPTION OF THE PREFERRED EMBODIMENT

Figure 1:
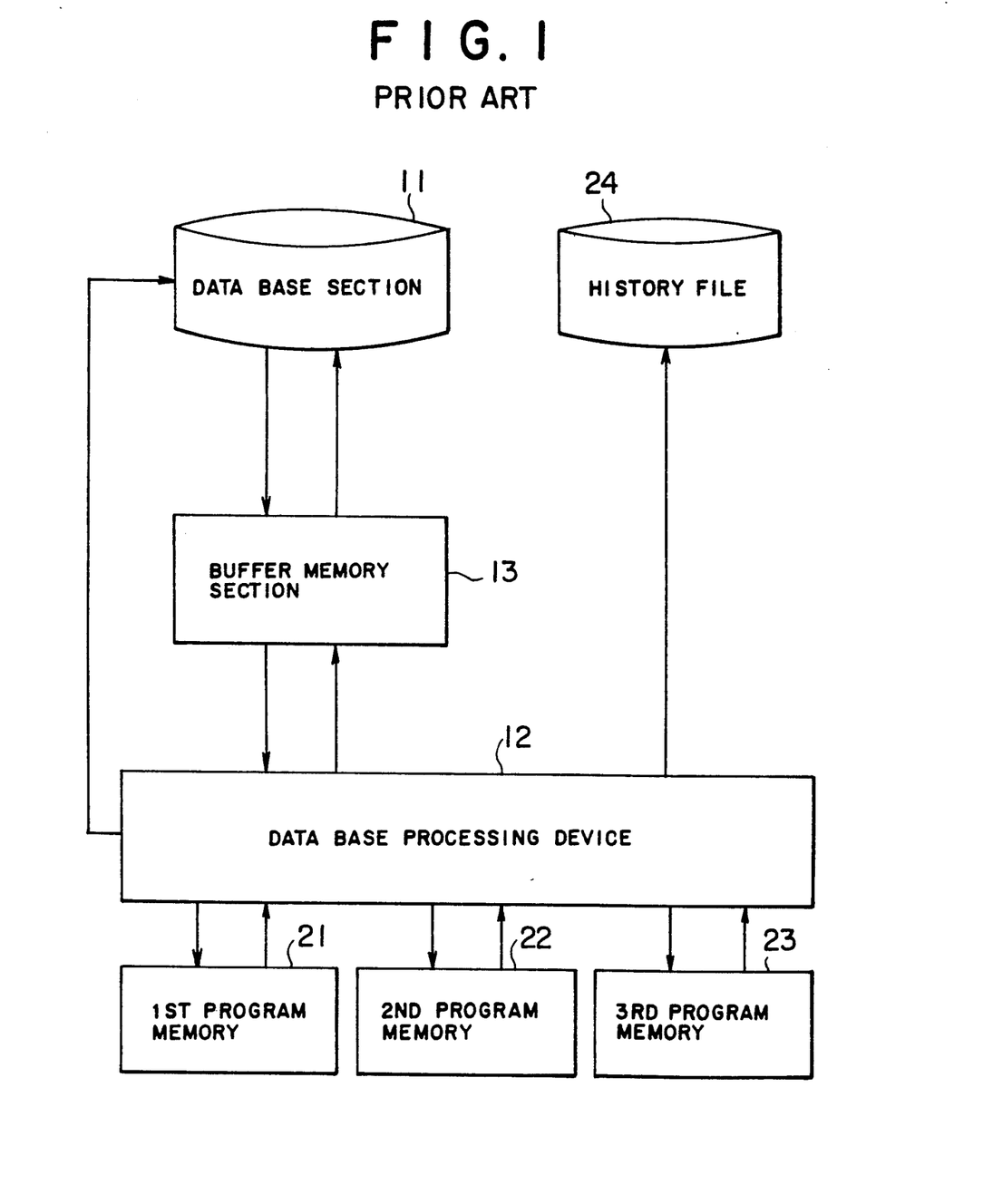
FIG. 1 is a block diagram of a conventional data base system.

Referring to FIG. 1, description will be made as regards a conventional data base system for a better understanding of this invention. The illustrated data base system comprises a data base section 11 for memorizing a plurality of data blocks. The data base section 11 is connected to a data base processing device 12 through a buffer memory 13. In the illustrated example, the buffer memory 13 is assumed to memorize a selected one of the data blocks transferred from the data base section 11. The data base processing device 12 executes a data base program. More particularly, the data base processing device 12 may be connected to first through third data base program memories 21 to 23 for memorizing first through third data base programs which may be different from one another. Each of the first through the third data base programs is supplied to the data base processing device 12 on demand.

On searching a specific one of the data blocks by the first data base program, the first data base program may produce a data block search request signal which specifies the specific data block so that the data base processing device 12 accesses the data base section 11 to deliver the specific data block to the buffer memory 13. The buffer memory 13 memorizes the specific data block as the buffered data block. As a result, the data base processing device 12 can directly search the specific data block.

On renewal of the specific data block into a renewal data block, the data base processing device 12 renews the specific data block into the renewal data block on the buffer memory 13 in accordance with the first data base program to send the renewal data block to the data base section 11. The data base processing device 12 produces a history data concerned with the specific data block to make a history data file 24 store the history data.

When a fault occurs during a search or a renewal operation, the data base processing device 12 reads the history data from the history data file 24 to produce the specific data block in accordance with the history data.

The data base processing device 12 deliver the specific data block to the data base section 11 through the buffer memory 13 to restore the specific data block in the data base section 11.

As described above, the data base processing device 12 must read the history data for the history data file 24 for restoration of the specific data block in the data base section 11 when the fault occurs during the operation. As a result, it is difficult to quickly restore the specific data block in the data base section 11.

Figure 2:
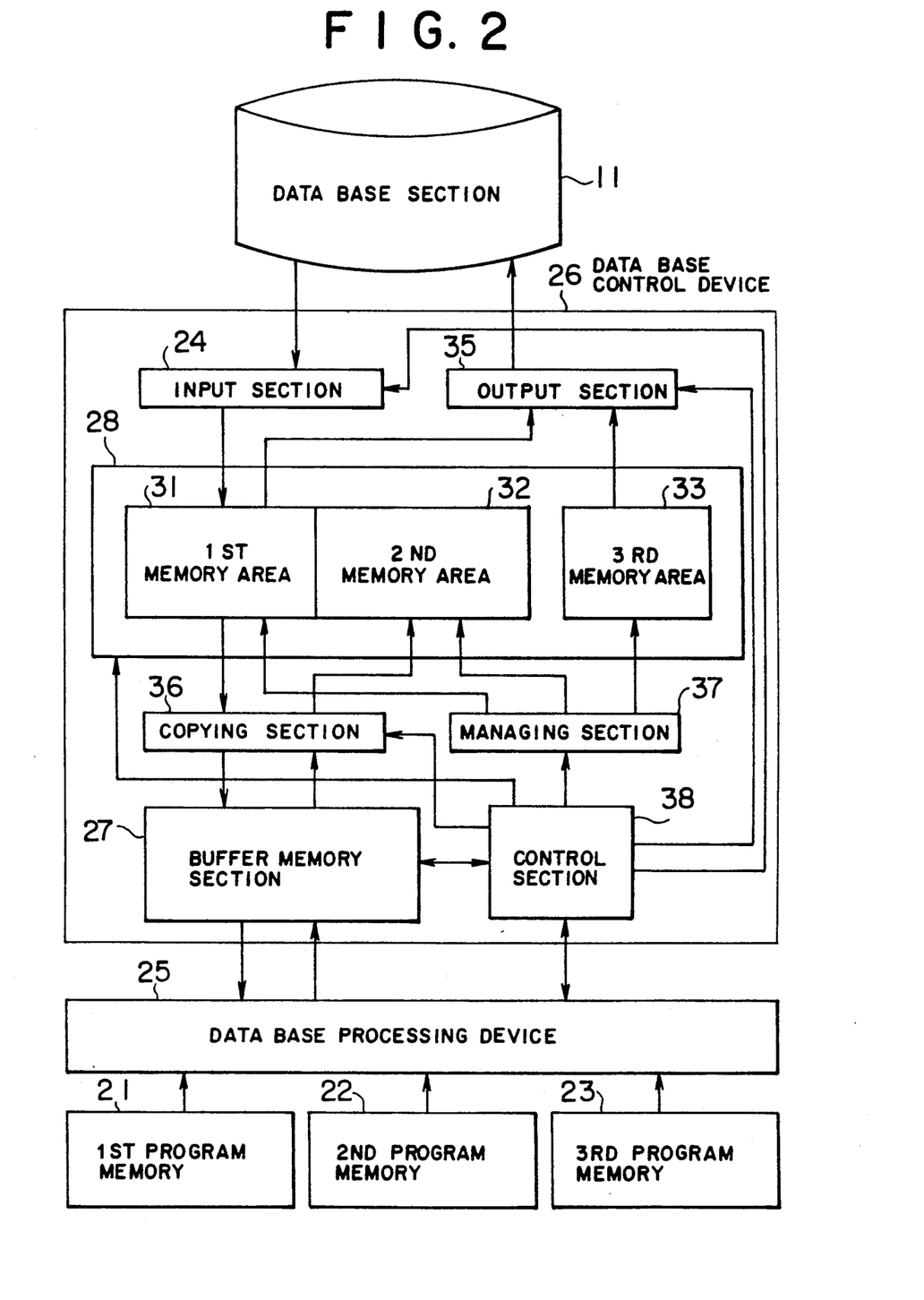
FIG. 2 is a block diagram of a data base system according to an embodiment of this invention.

Referring to FIG. 2, description will proceed to a data base system according to a preferred embodiment of this invention. In FIG. 2, the data base system comprises the data base section 11, the first through the third program memories 21 to 23 which are described in conjunction with FIG. 1, and a data base processing device. The data base processing device is somewhat different from that described in conjunction with FIG. 1 and is therefore designated afresh by a reference numeral 25. The data base system further comprises a data base control device 26 which is located between the data base section 11 and the data base processing device 25.

The data base control device 26 comprises a buffer memory section 27 for memorizing selected at least one of the data blocks of the data base section 11 as a buffered data block. The buffer memory section 27 may memorize a plurality of buffered data blocks different from one another. The buffer memory section 27 may be formed by a volatile storage and may be positioned on a main memory of a computer (not shown).

The data base control device 26 further comprises a memory section 28 having first through third memory areas 31 to 33. In the illustrated example, the first and the second memory areas 31 and 32 are assumed to memorize first and second selected ones of the data blocks as first and second data blocks, respectively. The first memory area 31 may memorize a plurality of the first data blocks different from one another. Similarly, the second memory area 32 may memorize a plurality of the second data blocks different from one another. The third memory area 33 is for memorizing management information for use in managing the first and the second data blocks in a manner to be described later. The memory section 28 may be a non-volatile storage.

In addition, the data base control device 26 comprises input and output sections 34 and 35, each of which is connected to both the data base section 11 and the memory section 28, a copying section 36 between the buffer memory section 27 and the memory section 28, a managing section 37 connected to the memory section 28, and a control section 38 for controlling the input and the output sections 34 and 35, the copying section 36, and the managing section 37, as will be described hereinafter.

Figure 3:
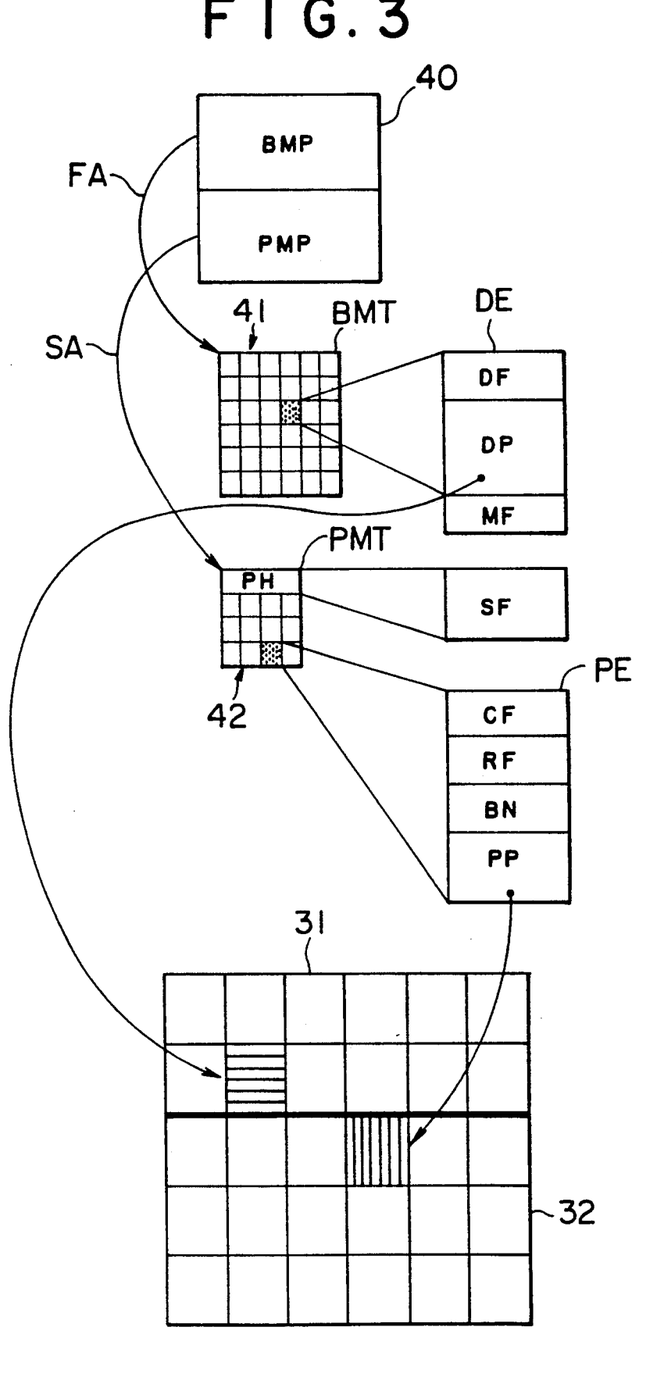
FIG. 3 is a diagram for describing management information which is memorized in a data base control section illustrated in FIG. 2.

Referring to FIG. 3 in addition to FIG. 2, description will be made as regards a detailed structure of the third memory area 33 for a better understanding of this invention. The third memory area 33 comprises a management information header area 40, a data base management area 41, and a processing program management area 42, as illustrated in FIG. 3. The management information header area 40 has a partial zone for memorizing a data base management information portion which is labelled BMP and which is for use in managing the data base section 11 at each data block of the data base section 11. Furthermore, the management information header area 40 has another partial zone for memorizing a processing program management information portion which is labelled PMP and which is for use in managing each of the first through the third programs memorized in the first through the third program memories 21 to 23, respectively.

The data base management area 41 is for memorizing a data base management table BMT. The data base management table BMT serves to manage the first data blocks memorized in the first memory area 31. The data base management table BMT has a group of data entries each of which is labelled DE in FIG. 3 and each of which corresponds to one of the data blocks memorized in the data base section 11. Each of the data entries DE stores a data output flag DF, a data pointer DP, and a data modification flag MF, as will be described hereinafter. The data base management table BMT is pointed to by the data base management information portion BMP as shown by a first arrow designated by FA in a manner to be described in detail hereinafter.

The processing program management area 42 is operable to memorize a processing program management table PMT. The processing program management table PMT has a program header PH specified by a stationary flag SF and a group of program entry indicators PE, respectively. Each of the program entry indicators PE has a completion flag CF, a replacement flag RF, a block number BN, and a program pointer PP. The illustrated processing program management table PMT is pointed to by the processing program management information portion PMP, as shown by a second arrow SA, in a manner to be described later in detail.

Turning back to FIG. 2, the first memory area 31 has a plurality of first subareas, each of which is for memorizing one of the first data blocks. The first subareas have primary data addresses different from one another. Each of the first data blocks is pointed to by one of the data pointers DP stored in each data entry of the data base management table BMT. Likewise, the second memory area 32 has a plurality of second subareas, each of which is for memorizing one of the second data blocks. The second subareas have secondary data addresses different from one another. Each of the second data blocks is pointed to by one of the program pointers PP illustrated in FIG. 3.

Figure 4:
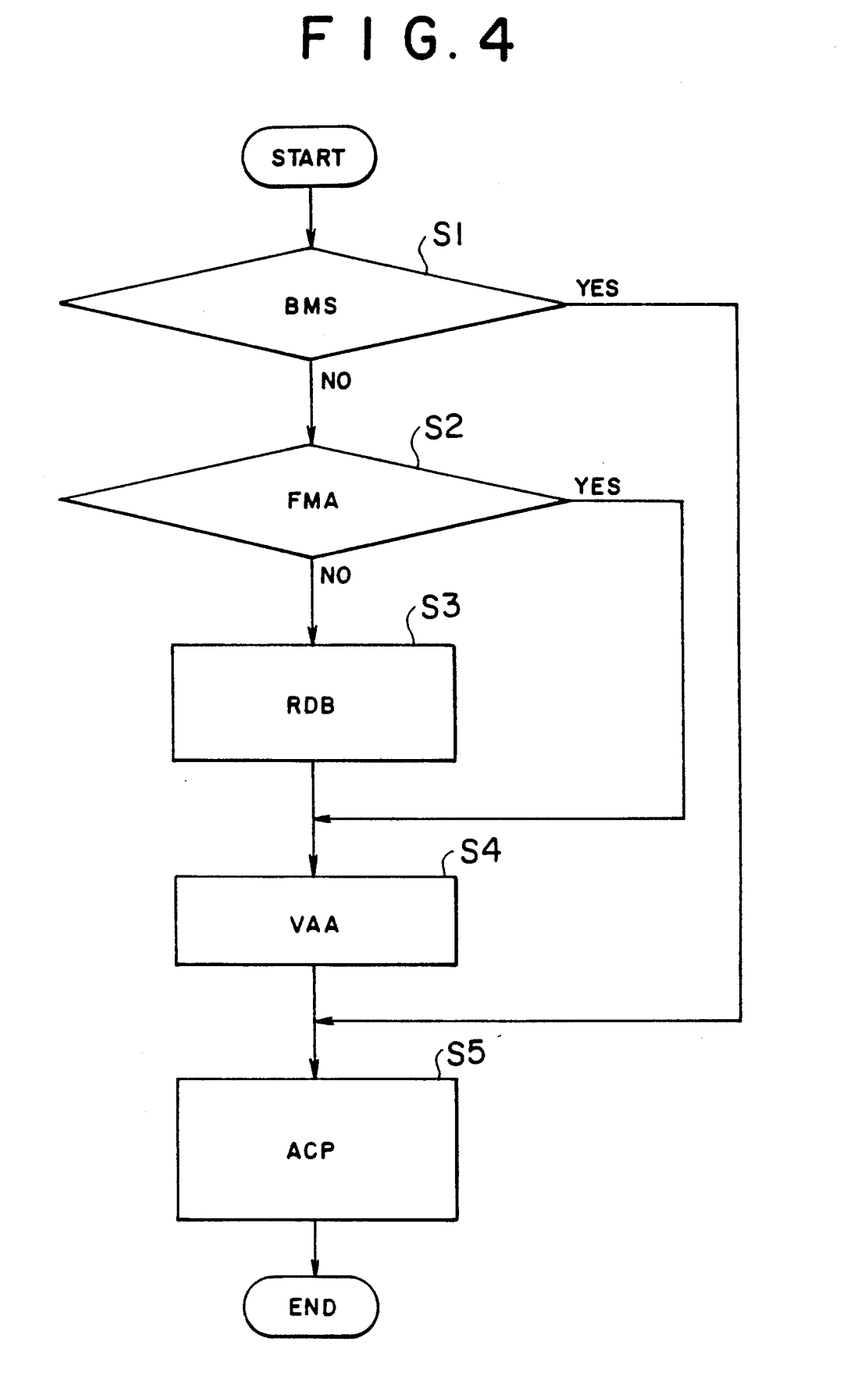
FIG. 4 is a flow chart for describing a searching operation in the data base system illustrated in FIG. 2.

Referring to FIG. 4 together with FIGS. 2 and 3, description will proceed to a search operation in the data base system illustrated in FIG. 2. Let a specific one of the data blocks be searched by a specific one of the processing programs, for example, the first processing program. In this event, the first processing program supplies the data base processing device 25 with a specific data block search request signal which specifies the specific data block. As a result, the data base processing device 25 delivers the specific data block search request signal to the control section 38. Responsive to the specific data block search request signal, the control section 38 accesses the buffer memory section 27 to detect whether or not the specific data block is memorized in the buffer memory section 27 at a first step S1 shown by BMS.

When the specific data block is not memorized in the buffer memory section 27, the control section 38 detects whether or not the specific data block is memorized in the first memory area 31 at a second step S2 suggested by FMA. In this case, the control section 38 controls the managing section 37 so that the managing section 37 refers to the management information in the third memory area 33. Specifically, the managing section 37 investigates the data base management portion BMP in the management information header portion 40 in relation to the specific data block. Then, the data base management table 41 is accessed by the data base management information portion BMP. Namely, the managing section 37 detects whether or not a predetermined code of, for example, "0" is registered in a specific one of the data entries DE that corresponds to the specific data block. More specifically, the managing section 37 detects whether or not "0" is included in the data pointer DP of the specific data entry DE. When the "0" is included in the data pointer DP of the specific data entry DE, the managing section 37 supplies an absence signal to the control section 38.

Supplied with the absence signal, the control section 38 controls the input section 34 so that the input section 34 reads the specific data block as a read data block RDB from the data base section 11 at a third step S3 abbreviated as RDB. The input section 34 delivers the read data block RDB to the first memory area 31 to store the same as the first data block in a vacant subarea of the first memory area 31. After delivery of the read data block to the first memory area 31, the input section 34 supplies the control section 38 with a read out signal which is representative of address information indicating an address of the vacant subarea in which the read data block is memorized. Responsive to the read out signal, the control section 38 controls the managing section 37 to register the address information in that data pointer area DP of the data entry DE which corresponds to the read data block.

The control section 38 controls the copying section 36 to copy the read data block as the buffered data block in a vacant area of the buffer memory section 27 at a fourth step S4 labelled VAA. The control section 38 informs the data processing device 25 of permission of an access operation to the buffer memory section 27 at a fifth step S5 labelled ACP. The permission includes an address of the read data block in the buffer memory section 27. As a result, the data base processing device 25 can access the buffer memory section 27 to read the read data block as the specific data block from the buffer memory section 27.

On the other hand, the control section 38 carries out the fifth step S5 when the control section 38 detects that the specific data block is memorized in the buffer memory section 27 at the first step S1. In addition, when the specific data block is memorized in the first memory area 31 at the second step S2, the control section 38 carries out the fourth step S4, as illustrated in FIG. 4.

Only referring to FIG. 2, the data base processing device 25 may renew the specific data block into a renewal data block in accordance with one of the first through the third processing programs, for example, the first processing program. In this event, the data base processing device 25 supplies the buffer memory section 27 with the renewal data block which is stored as the buffered data block in the buffer memory section 27.

Figure 5:
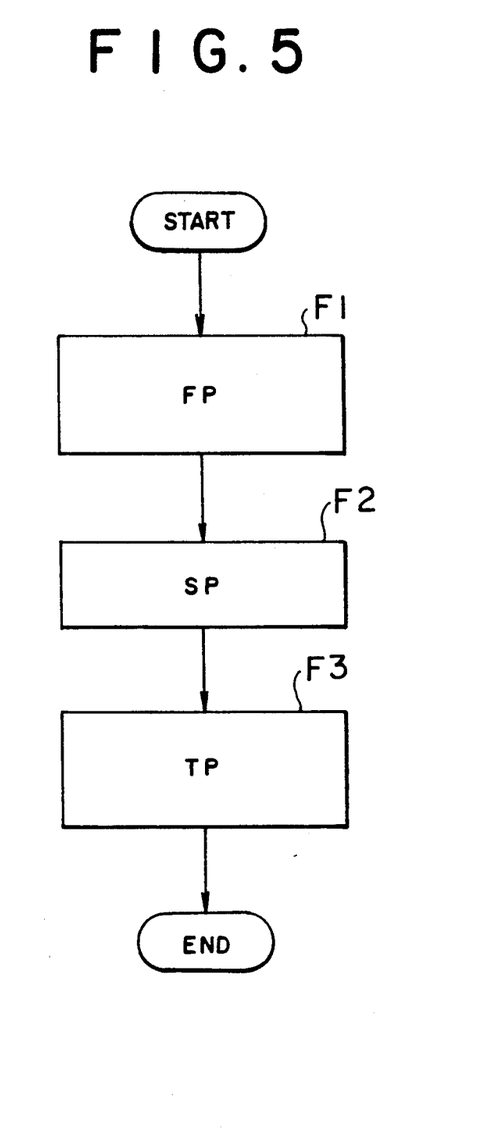
FIG. 5 is a flow chart for describing a restoring operation in the data base system illustrated in FIG. 2.

Referring to FIG. 5 in addition to FIGS. 2 and 3, the search and the renewal operations are successively carried out in the data base system illustrated in FIG. 2 in the manner described above. After completion of the search and the renewal operations, the first processing program produces a stationary point information signal which is representative of a stationary point, namely, an end of the search and the renewal operations. As a result, the data base processing device 25 supplies the control section 38 with a stationary signal representative of a stationary state. Responsive to the stationary signal, the control section 38 carries out a predetermined operation which will be called "stationary operation" hereinafter.

The control section 38 controls the copying section 36 to make the copying section 36 copy the renewal data block of the buffer memory section 27 as the second data block to be memorized in a vacant subarea of the second memory area 32 at a first phase F1 labelled FP. The vacant subarea of the second memory area 32 will be called a renewal subarea hereinafter. After the renewal data block is memorized in the renewal subarea of the second memory area 32, the control section 38 controls the managing section 37 to make the managing section 37 register a data block number of the renewal data block and an address of the renewal subarea in a vacant entry of the program entries PP. The vacant entry of the program entries PP will be called a renewal entry hereinafter. More particularly, the data block number of the renewal data block is registered in the block number area BN of the renewal entry while the address of the renewal subarea is registered as a renewal program pointer PP in the renewal entry.

At a second phase F2 labelled SP, the managing section 37 is further controlled by the control section 38 to supervise the stationary flag SP of the program header portion PH which corresponds to the first processing program. The stationary flag SF will be referred to as a renewal stationary flag SF hereinafter. The managing section 37 turns the renewal stationary flag SF into an on state. The copying section 36 is controlled by the control section 38 to copy the renewal data block and the specific data block as the first data block to be memorized into the first memory area 31 and the second data block to be memorized into the second memory area 32, respectively. As a result, the first memory area 31 memorizes the renewal data block while the second memory area 32 memorizes the specific data block. More specifically, the replacement flag RF of the program entry PE, which corresponds to the renewal data block, is turned into the on state by the managing section 37. The replacement flag RF will be called renewal replacement flag RF. The managing section 37 temporarily holds the renewal program pointer PP of the renewal entry PE. The managing section 37 transfers the data pointer DP of the specific entry DE to the renewal entry PE. The managing section 37 transfers the renewal program pointer PP held therein to the specific entry DE and turns the data modification flag MF of the specific data entry into an on state.

Furthermore, the managing section 37 turns the completion flag CF of the renewal program entry into an on state. It is readily understood from the above description that the renewal data block is memorized as the first data block in the first memory area 31 by the managing section 37 and the control section 38 and that the specific data block is memorized as the second data block in the second memory area 32.

Thereafter, the control section 38 informs the data base processing device 25 of completion of the stationary operation. The control section 38 controls the managing section 37 to make the managing section 37 turn the data output flag DF of the specific entry DE into the on state. When the data output flag DF of the specific entry DE is turned into the on state, the output section 35 supplies the data base section 11 with the renewal data block of the first memory area 31 which is indicated by the data pointer DP of the specific entry DE.

Referring to FIG. 2 in addition to FIG. 3, description will be made as regards a restoration operation in the data base system illustrated in FIG. 2. When a fault occurs during the stationary operation, the managing section 37 is controlled by the control section 38 to detect whether the data output flag DF of the specific data entry DE is kept at an on state or an off state. When the data output flag DF of the specific data entry DE is kept at the off state, the managing section 37 further monitors the modification flag MF of the specific data entry DE to detect whether or not the modification flag MF is kept at the on state.

If the modification flag MF of the specific data entry DE is kept at an off state, the managing section 37 judges that the specific data block is memorized in the first memory area 31. In this case, the managing section 37 supplies the control section 38 with a first presence signal representative of presence of the specific data block in the first memory area 31. Consequently, the control section 38 knows by reception of the first presence signal that the specific data block is memorized in the first memory area 31.

When the data output flag DF of the specific data entry DE is kept at the off state and the modification flag MF of the specific data entry DE is kept at the on state, the managing section 37 supplies the control section 38 with a second presence signal representative of presence of the specific data block in the second memory area 32. Responsive to the second presence signal, the managing section 37 exchanges the program pointer PP of the renewal entry PE for the data pointer DP of the specific entry DE under control of the control section 38. Namely, the specific data block is actually memorized in the first memory area 31.

On the other hand, when the data output flag DF of the specific data entry DE is kept at the on state, the managing section 37 knows that the stationary operation is already finished. The managing section 37 supplies the control section 38 with an end signal representative of completion of the stationary operation. Supplied with the end signal, the output section 35 transfers the specific data block from the first data area 31 to the data base section 11 under control of the control section 38.

In conjunction with FIG. 2, it is readily understood from the above description that the managing section 37 and the control section 38 is collectively operable as a control device for processing the management information which is memorized in the third memory area 33.

What is claimed is:

1. A data base system comprising:
a data base section for memorizing a plurality of data blocks;
a buffer memory section for memorizing a selected one of said data blocks as a buffered data block;
a request producing section for producing a data block search request signal which specifies a specific data block when accesses said buffer memory section;
first memory means having a non-volatile storage structure for memorizing a first selected one of said data blocks as a first data block; and
control means coupled to said request producing section, said buffer memory section, and said first memory means for transferring said first data block to said buffer memory section in response to said data block search request signal when said specific data block is absent in said buffer memory section.

2. A data base system as claimed in claim 1, said control means producing an absence signal when said specific data block is absent in said first memory means; said data base system further comprising:
reading means responsive to said data block search request signal and said absence signal for reading a requested one of said data blocks from said data base section to transfer said requested data block as said specific data block to said first memory means and to store said specific data block as said first data block; and
copying means for copying said first data block of said first memory means to deliver said first data block to said buffer memory section.

3. A data base system as claimed in claim 1, said request producing section producing a data block renewal signal which is representative of a renewal operation, wherein said data base system further comprises:
processing means responsive to said data block renewal signal for processing said specific data block into a renewal data block to store said renewal data block in said buffer memory section instead of said specific data block.

4. A data base system as claimed in claim 2, said request producing section further producing a data block renewal signal which is representative of a renewal operation, wherein said data base system further comprises:
processing means responsive to said data block renewal signal for processing said specific data block into a renewal data block to store said renewal data block in said buffer memory section instead of said specific data block.

5. A data base system as claimed in claim 2, further comprising:
second memory means having a non-volatile storage structure for memorizing a second selected one of said data blocks as a second data block;
said copying means further copying said first data block of said first memory means to deliver the first data block as said second data block to said second memory means.

6. A data base system as claimed in claim 3, said request producing section further producing a stationary request signal which is representative of a stationary state when said renewal operation proceeds to an end, wherein:
said control means controls said copying means in response to said stationary request signal so as to copy said renewal data block of said buffer memory section to send the renewal data block to said second memory means.

7. A data base system as claimed in claim 6, said control means storing said renewal data block as said first data block in said first memory means and storing said specific data block as said second data block in said second memory means after said renewal data block is memorized in said second memory means.

8. A data base system as claimed in claim 6, further comprising:
writing means for writing said first data block as said data block to said data base section;
said control means controlling said writing means to make said writing means write said specific data block from the first memory means to said data base section when a fault occurs in said data base system.

9. A data base system as claimed in claim 7, further comprising:
  writing means for writing said first data block as said data block to said data base section;
  said control means controlling said writing means to make said writing means write said renewal data block from said first memory means to said data base section.

10. A data base system as claimed in claim 7, further comprising:
  writing means for writing said first data block as said data block to said data base section;
  said control means storing said specific data block in said first memory means and storing said renewal data block in said second memory means when a fault occurs in said data base system, said control means controlling said writing means to make said writing means write said specific data block from said first memory means to said data base section.

* * * * *